J. SUTHERLAND.
ATTACHMENT FOR DRIVING REINS OF DOUBLE HARNESS.
APPLICATION FILED FEB. 12, 1908.
903,619.　　　　　　　　　　　　　Patented Nov. 10, 1908.
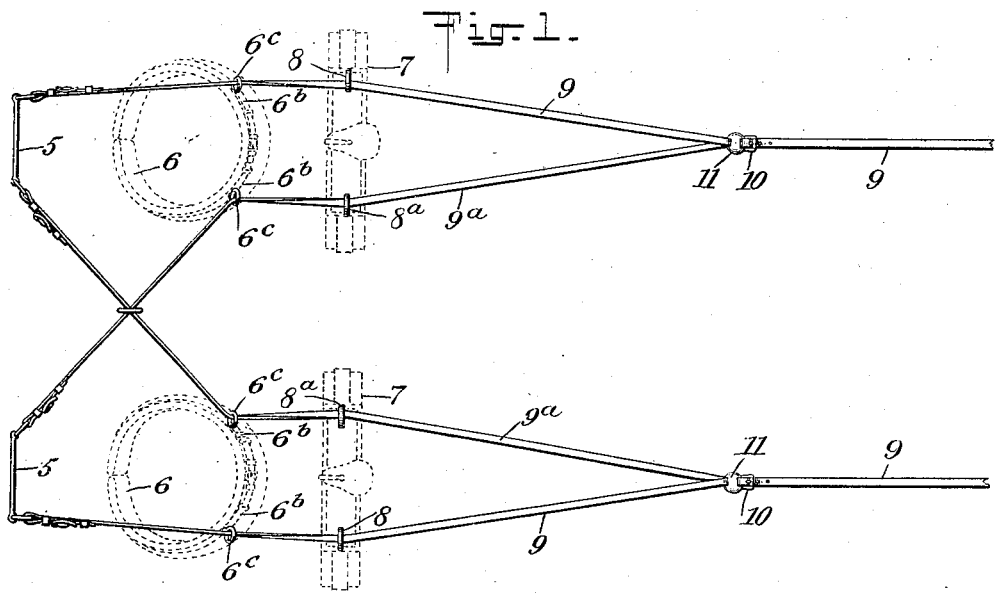
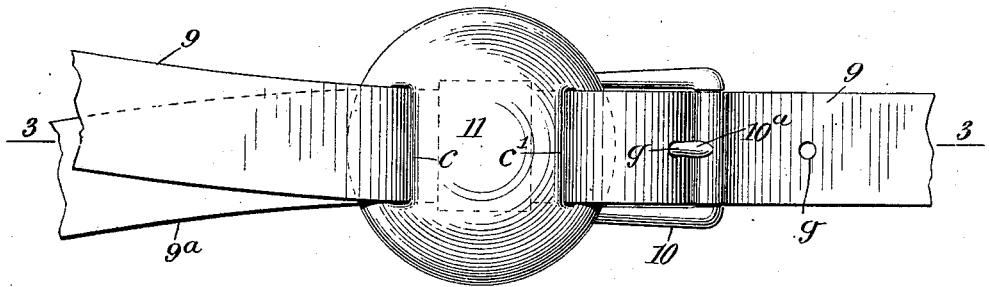
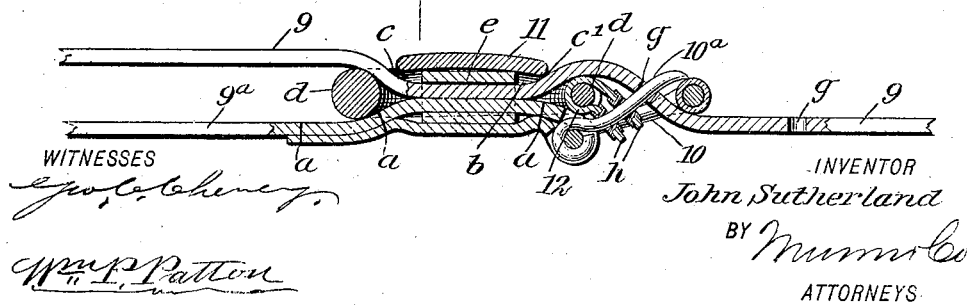

UNITED STATES PATENT OFFICE.

JOHN SUTHERLAND, OF SPRINGER, TERRITORY OF NEW MEXICO.

ATTACHMENT FOR DRIVING-REINS OF DOUBLE HARNESS.

No. 903,619.     Specification of Letters Patent.     Patented Nov. 10, 1908.

Application filed February 12, 1908. Serial No. 415,594.

*To all whom it may concern:*

Be it known that I, JOHN SUTHERLAND, a citizen of the United States, and a resident of Springer, in the county of Colfax and Territory of New Mexico, have invented a new and Improved Attachment for Driving-Reins of Double Harness, of which the following is a full, clear, and exact description.

This invention relates to a safety appliance for driving reins for control of two draft animals, connected by a double harness to a vehicle.

Double harnesses for horses are made in different styles, the usual construction therefor which is herein shown and described, embodying a back saddle for each harness, held in place upon the animal by a girth band, a collar, and hames also forming portions of each set of harness.

In arranging two pairs of driving reins for the control of a pair of horses hitched side by side to a vehicle, each pair of reins comprises one long rein and one short rein. The longer rein of the pair leads from the outer ring on a driving bit, through a ring on a respective pair of hames, and thence through a terret ring on a corresponding harness saddle, from which the rein trends rearward for manipulation by the driver of the team. The corresponding shorter rein for each pair of reins, is at its forward end connected to the remaining or inner ring on a respective driving bit, and thence trends rearwardly and across for a loose engagement with a ring on the hames for the other set of harness. From said hame rings, each shorter rein is extended rearward through a terret ring on the harness saddle for a respective set of harness, and terminates in a buckle that is engaged with the outer or longer rein, at a short distance rearward from the terret rings.

Spirited horses are given to tossing their heads so as to draw upon the reins, particularly when annoyed by insects, and when swinging their heads laterally, shorten the reins between the terret rings and buckled connections between the longer and shorter reins. It sometimes occurs that for the cause stated, the buckle and short termination of the shorter rein, are drawn through the adjacent complementary terret ring and become interlocked therewith, so that the rein cannot be moved, and in consequence all control of the team is lost and a runaway of the latter is liable to result in a serious accident.

The object of my invention is to provide a novel, simple attachment for double harness, which will positively prevent an accident occurring from the cause stated, by rendering it impossible for the connecting buckles between the long and short members of each pair of reins from passing through a complementary terret ring, or from becoming so engaged therewith as to prevent full control of the reins and the horses connected thereto.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a diagrammatic plan view of two pairs of reins, arranged for use on double harness, portions of the latter being shown in dotted lines; Fig. 2 is an enlarged plan view of lapped portions of two straps that are coacting members of driving reins, a buckle connecting said straps, and the improved attachment adjustably mounted upon said straps and buckle, and Fig. 3 is a longitudinal sectional view, substantially on the line 3—3 in Fig. 2.

In the drawings that show an application of the improvement upon ordinary harness and driving reins, for control of animals whereon said harness may be mounted, 5, 5, indicate driving bits; 6, 6, collars shown in dotted lines; $6^b$ hames carried by the collars; 7, 7, in dotted lines indicate two similar saddle trees that are portions of double harness; and 8, $8^a$, two similar terret rings shown spaced upon each saddle tree. Each pair of the duplicate driving reins comprises an outer long rein 9 and a shorter rein $9^a$. The reins 9 have their forward ends connected with the outer ends of the driving bits 5, 5, and thence are extended rearward through respective carrier rings $6^c$, that are mounted upon the hames $6^b$ on each collar 7, and thence through corresponding terret rings 8, 8, from which said longer reins trend rearward for manipulation by a driver. The shorter reins $9^a$ are each attached by a forward end thereof upon an inner end of a respective driving bit 5, and thence are passed diagonally across and rearward through a respective ringe 6ᶜ, from which the reins 9ᵃ trend toward and through the remaining terret rings 8ᵃ, 8ᵃ. From the terret rings 8ᵃ, each shorter rein 9ᵃ is extended a short distance toward the adjacent outer or long rein 9 it is to be connected with, and upon its extremity a buckle 10 is mounted and loosely secured, by lapping said end and stitching the same upon an adjacent portion thereof, as shown at $a$ in Fig. 3.

The frame of each buckle 10 carries a tongue 10ᵃ, that may be engaged with any one of a series of spaced perforations $g$, formed in the corresponding longer strap or rein 9 that passes through the buckle frame.

The buckled connection for each pair of driving reins, whereby the longer strap or rein is connected with the shorter rein thereof, is of well known construction, and obviously, if the buckle on either of the lapped and connected members 9, 9ᵃ, of either pair of reins, should be drawn forward sufficiently to pass through a respective terret ring 8, or 8ᵃ, the buckle 10 from its size and shape, is liable to become interlocked therewith and hold the rein from sliding through the terret ring rearwardly.

The improvement, which positively prevents the passage of either buckle 10 through a corresponding terret ring 8, or 8ᵃ, is extremely simple, and consists in the provision of a check block for each buckle, said similar check blocks each comprising a preferably circular body piece 11, having a correspondingly shaped concavity $b$ and two spaced slots $c$, $c'$, that are formed transversely and parallel with each other, as shown in Fig. 2. The defining edge portion $d$ of each check block 11, is rounded in cross section, so that it assumes cylindrical form at each slot $c$, $c'$.

Each strap or rein member 9ᵃ, is provided with a keeper loop $e$, and as shown in Fig. 3 said loop and adjacent portions of the strap end are embedded in the recess or concavity $b$ in a respective check block 11, when the device is mounted upon the connected reins 9, 9ᵃ.

In placing the check block for each pair of reins in position thereon, the longer rein 9 is first passed down into the recess or concavity $b$ through the slot $c$, and then through a respective keeper loop $e$, from which said strap trends out through the slot $c'$ toward the tongue 10ᵃ, that is passed out through an appropriate perforation $g$ for contact with a cross bar of the buckle frame or sleeve thereon, as shown in Fig. 3. Upon the cylindrical rim portion $d$, that is adjacent to the rear transverse slot $c'$, a clip band 12 is mounted, said clip band consisting of a strip of suitable metal or leather bent into looped form, thus providing two spaced limbs $h$, which project toward the tongue 10ᵃ when the looped portion of the clip band is mounted upon the rim portion $d$. The limbs $h$ are transversely perforated and said perforations may be reinforced with eyelets, as shown in Fig. 3, the diameters of which permit the free insertion therethrough of the tongue 10ᵃ previous to its engagement with a selected perforation $g$ in the rein member 9.

It will be noted that from the relative dimensions of the check blocks 11, a forward pull on the rein 9 or 9ᵃ, of either pair of driving reins, will be arrested when said check blocks are drawn into engagement with a respective terret ring 8, or 8ᵃ. It will be evident furthermore, that the means for connecting the check blocks with the buckles by provision of the clips 12, enables the proper location of the check blocks on the reins for effective service.

The peculiar formation of the check blocks 11, adapts them for neat and secure connection with the reins at their buckled connections, and provides an ornamental finish for the reins where their members are joined together.

The check blocks may be formed of any suitable material, aluminum being preferred, on account of lightness and strength.

While it is preferred to give the check blocks circular peripheral form, it is not intended to restrict the shape to such a form, as the device may have a polygonal shape if this should be desired.

Having thus described my invention, I claim as new and desire to secure by Letters Patent:

1. An attachment for driving reins, comprising a recessed block having two spaced parallel slots therein, and a clip band engaging the rim of the block through one of said slots and adapted for engagement with the tongue of a buckle.

2. A check attachment for reins, comprising a circular block having a recess in one side, a cylindrical rim defining said recess, said block also having two parallel slots therein, and a looped clip band having spaced limbs, and engaging the rim of the block through one of the slots, said limbs being oppositely perforated and adapted for engagement with the tongue of a buckle.

3. An attachment for driving reins, comprising a block provided with a slot, and a clip band, engaging the rim of the block through the slot, and adapted for engagement with the tongue of a buckle.

4. The combination with two straps that are coacting members of driving reins, a buckle secured on the end of one strap and engaging with its tongue a perforation in the other strap, of a check block mounted upon the straps where they are buckled together, said block having two slots through which the strap which receives the buckle tongue is inserted, and a clip band in looped form having two oppositely perforated limbs, said clip band at its loop having loose connection with the rim of the check block through one slot therein, and the tongue of the buckle passing through the oppositely perforated limbs of the clip band before it is engaged with the perforated strap.

5. The combination with two connected strap members, of a pair of driving reins, of a block provided with a slot and a clip band engaging with the slot and connected with the strap members at their junction for the purpose set forth.

In testimony whereof I have signed my name to this specification in the presence of two subscribing witnesses.

JOHN SUTHERLAND.

Witnesses:
C. F. HORTENSTEIN,
S. FLOERSHEIM.